P. H. STARKE, Dec'd.
A. G. STARKE, Executrix.
PLOW.
No. 10,477. Reissued May 6, 1884.
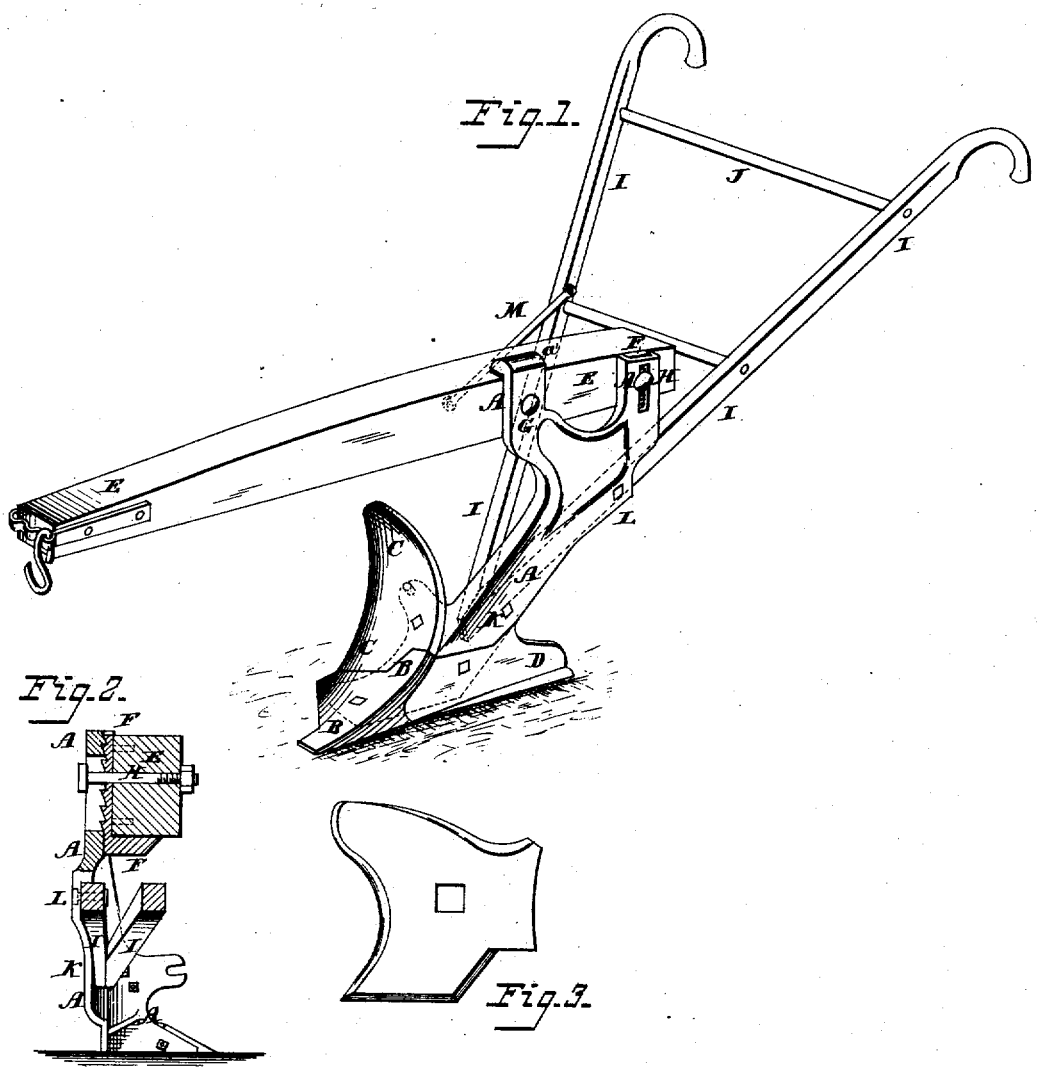
Attest:
Court. A. Cooper
Franklin H. Hough
Arabella G. Starke
Executrix of Patrick H. Starke, Inventor.
By W. T. Henderson, Attorney
N. PETERS, Photo-Lithographer, Washington, D. C.

UNITED STATES PATENT OFFICE.

ARABELLA G. STARKE, OF RICHMOND, VIRGINIA, EXECUTRIX OF PATRICK H. STARKE, DECEASED.

PLOW.

SPECIFICATION forming part of Reissued Letters Patent No. 10,477, dated May 6, 1884.

Original No. 117,574, dated August 1, 1871. Application for reissue filed February 29, 1884.

*To all whom it may concern:*

Be it known that I, ARABELLA G. STARKE, a citizen of the United States, residing at Richmond, in the county of Henrico and State of Virginia, am the executrix and devisee of PATRICK H. STARKE, who invented certain new and useful Improvements in Plows, for which Letters Patent were granted to him August 1, 1871, No. 117,574, of which the following is a specification, reference being had therein to the accompanying drawings.

Figure 1 is a perspective view of the improved plow. Fig. 2 is a detail sectional view of the same. Fig. 3 is a detail view of another form of mold-board.

Similar letters of reference indicate corresponding parts.

This invention consists in an improved construction of standard for turn-plows, as hereinafter fully described, and subsequently pointed out in the claim.

B is the point, C the mold-board, D the landside, E the beam, and I I the handles, of a turn-plow.

A represents the standard, which is inclined rearward and curved on the front edge, to prevent it from gathering grass and roots and becoming choked. The upper part has a forward projection or bearing flanged at its upper end, *a'*, and a rear one which has a groove or recess formed in the inner part thereof to receive the bearing-plate F, the said recess being curved in the arc of a circle whose center is in the front bearing. The flange *a'* overlaps the beam on its top surface. The beam E is provided with a journal-stud, G, which turns in the front bearing, while the bolt H, which secures the rear part of the beam and its adjustable bearing-plate to the standard, traverses a slot in the grooved or recessed portion of the standard, and thus permits the bearing-plate F, which is flanged at its lower end, as shown in Fig. 2, to be adjusted up or down in the arc of a circle in its groove or recess. The beam may be fastened at any point in this slot or groove by any suitable fastening device; but I prefer the double ratchet shown in Fig. 2 of the drawings.

By turning the beam E on its center of motion at G, the plow may be made to run deep or shallow.

Having thus described all that is necessary to a full understanding of the invention, what I esteem to be new, and desire to protect by Letters Patent, is—

The plow-standard A, having a front bearing or projection flanged to overlap the top of the beam, in combination with the bearing-plate F, adjustable in the recessed rear bearing or projection of the standard, said bearings being adapted to receive studs G H, to secure the beam to said standard and enable said beam to be turned on a center in the forward bearing, and thereby regulate the depth of the plow.

In testimony whereof I affix my signature in presence of two witnesses.

ARABELLA G. STARKE,
*Executrix and devisee of Patrick H. Starke, deceased.*

Witnesses:
E. D. STARKE,
JNO. F. MEREDITH.